(12) United States Patent
Tyagi et al.

(10) Patent No.: US 12,411,228 B2
(45) Date of Patent: Sep. 9, 2025

(54) MACHINE-LEARNING-BASED SUPER RESOLUTION OF RADAR DATA

(71) Applicant: Aptiv Technologies AG, Schaffhausen (CH)

(72) Inventors: Kanishka Tyagi, Agoura Hills, CA (US); Yihang Zhang, Calabasas, CA (US); Kaveh Ahmadi, Simi Valley, CA (US); Shan Zhang, Los Angeles, CA (US); Narbik Manukian, Los Angeles, CA (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 489 days.

(21) Appl. No.: 17/661,223

(22) Filed: Apr. 28, 2022

(65) Prior Publication Data

US 2023/0140890 A1     May 11, 2023

Related U.S. Application Data

(60) Provisional application No. 63/277,447, filed on Nov. 9, 2021.

(51) Int. Cl.
*G01S 13/89* (2006.01)
*G06T 3/4046* (2024.01)
*G06T 3/4053* (2024.01)

(52) U.S. Cl.
CPC ............ *G01S 13/89* (2013.01); *G06T 3/4046* (2013.01); *G06T 3/4053* (2013.01)

(58) Field of Classification Search
None
See application file for complete search history.

(56) References Cited

U.S. PATENT DOCUMENTS

| 11,536,801 B1 * | 12/2022 | Li .................... B60W 60/001 |
| 11,836,852 B2 * | 12/2023 | Guan ................... G06N 3/047 |

(Continued)

FOREIGN PATENT DOCUMENTS

EP     3825728 A1     5/2021

OTHER PUBLICATIONS

"Extended European Search Report", EP Application No. 22197381. 1, Mar. 15, 2023, 8 pages.

*Primary Examiner* — Vladimir Magloire
*Assistant Examiner* — Brandon James Henson
(74) *Attorney, Agent, or Firm* — Harness, Dickey & Pierce, P.L.C.

(57) ABSTRACT

This document describes techniques and systems for machine-learning-based super resolution of radar data. A low-resolution radar image can be used as input to train a model for super resolution of radar data. A higher-resolution radar image, generated by an effective, but costly in terms of computing resources, traditional super resolution method, and the higher-resolution image can serve as ground truth for training the model. The resulting trained model may generate a high-resolution sensor image that closely approximates the image generated by the traditional method. Because this trained model needs only to be executed in feed-forward mode in the inference stage, it may be suited for real-time applications. Additionally, if low-level radar data is used as input for training the model, the model may be trained with more comprehensive information than can be obtained in detection level radar data.

20 Claims, 9 Drawing Sheets

(56) References Cited

U.S. PATENT DOCUMENTS

| | | | |
|---|---|---|---|
| 2017/0026860 A1* | 1/2017 | Fuller | H04W 4/90 |
| 2020/0041612 A1 | 2/2020 | Harrison | |
| 2020/0249314 A1 | 8/2020 | Eshet et al. | |
| 2020/0400810 A1 | 12/2020 | Cho et al. | |
| 2021/0064802 A1* | 3/2021 | Albert | G06N 3/047 |
| 2021/0149041 A1* | 5/2021 | Cho | G06T 3/4046 |
| 2021/0396843 A1* | 12/2021 | Santra | G01S 7/415 |

* cited by examiner

MACHINE-LEARNING-BASED SUPER RESOLUTION OF RADAR DATA

CROSS-REFERENCE TO RELATED APPLICATION

This application claims the benefit of U.S. Provisional Patent Application No. 63/277,447, filed Nov. 9, 2021, which is incorporated by reference herein in its entirety.

BACKGROUND

Advanced safety or driving systems for vehicles may use electromagnetic sensors (e.g., radar) to track nearby objects. These objects may include other vehicles, pedestrians, and animals, as well as inanimate objects, such as trees and street signs. The sensors collect low-level data, including information in different dimensions (e.g., range, Doppler, azimuth, elevation), that can be processed to estimate positions, trajectories, and movements of the objects.

In radar systems, the angular resolution of the low-level radar data can be limited by the size of the radar. This limitation can result in a poorly resolved radar image in the azimuth or elevation dimensions and can diminish the capability of the radar system to detect and classify objects.

SUMMARY

This document describes techniques and systems for machine-learning-based super resolution of radar data. A low-resolution radar image can be used as input to train a model for super resolution of radar data. A higher-resolution radar image, generated by an effective, but costly in terms of computing resources, traditional super-resolution method, and the higher-resolution image can serve as ground truth for training the model. The resulting trained model may generate a high-resolution radar image that closely approximates the image generated by the traditional method. Because this trained model needs only to be executed in feed-forward mode in the inference stage, it may be suited for real-time applications. Additionally, if low-level radar data is used as input for training the model, the model may be trained with more comprehensive information than can be obtained in detection level radar data.

In one example, a method includes obtaining, from an electromagnetic sensor, sensor data. The method further includes generating, based on the sensor data, a first sensor image representing the sensor data in multiple dimensions. The method further includes generating, based on the sensor data, a second sensor image having a higher resolution in the multiple dimensions than the first sensor image. The method further includes training, by machine learning and based on the first sensor image being used as input data and the second sensor image being used as ground truth data, a model to generate a high-resolution sensor image similar to the second sensor image, the high-resolution sensor image to be used for at least one of detecting objects, tracking objects, classification, or segmentation.

These and other described techniques may be performed by hardware or a combination of hardware and software executing thereon. For example, a computer-readable storage media (CRM) may have instructions stored thereon and that when executed configure a processor to perform the described techniques. A system may include means for performing the described techniques. A processor or processor unit may be part of a system that is configured to execute the methods and techniques described herein.

Through implementation of these and other examples contemplated by this disclosure, high-resolution radar data can be achieved from super resolving low-level radar data using a machine learned model. This Summary introduces simplified concepts related to machine-learning-based super resolution of radar data, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of machine-learning-based super resolution of radar data is described in this document with reference to the Drawings that may use same numbers to reference like features and components, and hyphenated numbers to designate variations of these like features and components. The Drawings are organized as follows:

FIGS. 7-1 and 7-2 illustrate multiple input channels to a super resolution model configured for machine-learning-based super resolution of radar data, in accordance with techniques of this disclosure.

DETAILED DESCRIPTION

Overview

Figure 1:
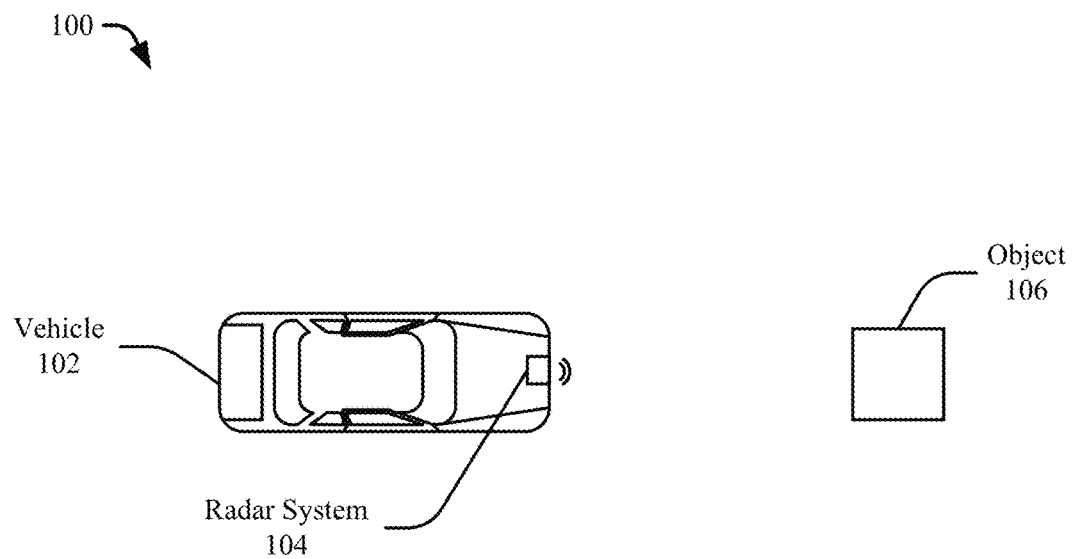
FIG. 1 illustrates an example training environment for machine-learning-based super resolution of radar data, in accordance with techniques of this disclosure.
Figure 1:
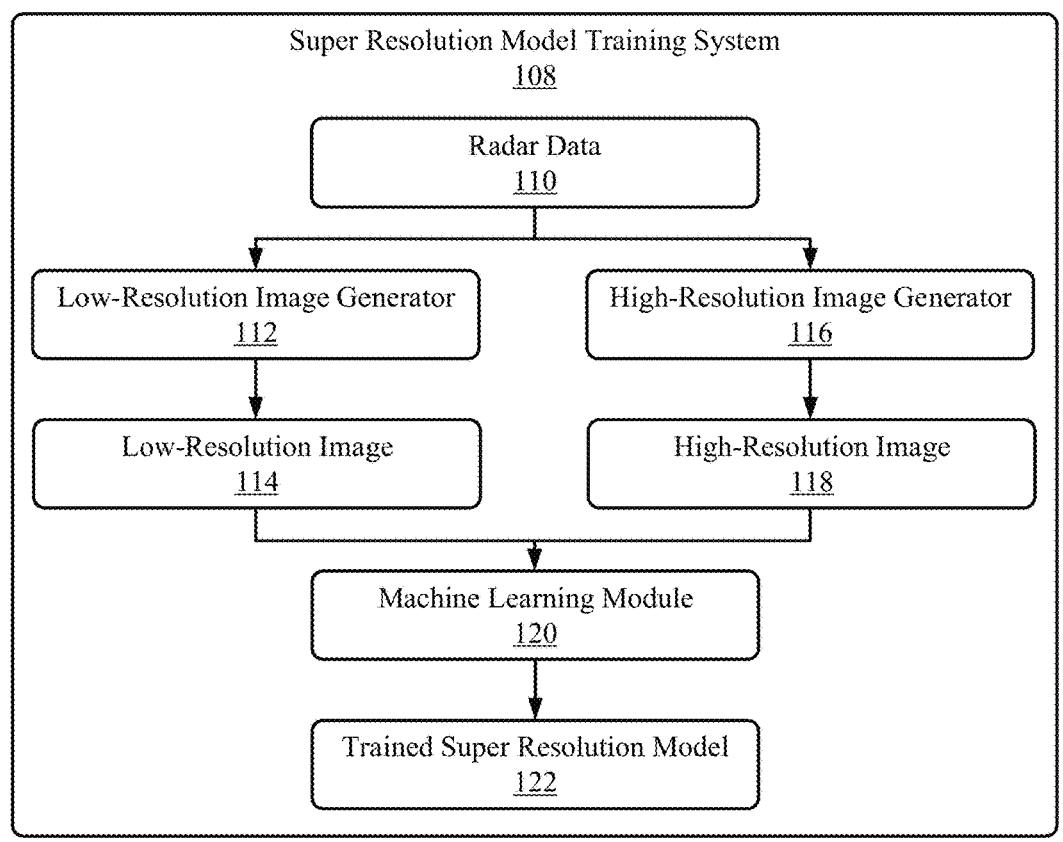

Radar systems can collect low-level radar data (e.g., time-series, uncompressed data cubes, lossless fast Fourier transforms (FFT)) that includes information in multiple dimensions such as range, Doppler, azimuth, and elevation. Generally, the resolution of the information in the range and Doppler dimensions is greater than the resolution of the angular resolutions associated with azimuth or elevation.

Super-resolution methods endeavor to increase the resolution of a radar image in all the dimensions, and particularly, the angular resolutions. Some traditional processes for super resolution of radar data have used detection level data (e.g., compressed data, data after thresholding) and iterative approaches based on sparse recovery methods. However, the reduction of low-level radar data to detection level data may lose information contained in the low-level radar about the nature of the scattering objects, since it reduces them to point scatterers. These processes may limit the detection and classification of objects whether standard classification methods or machine-learning-based methods have been used. Additionally, effective traditional methods, such as multiple signal classification (MUSIC) and iterative adaptive algorithm (IAA) can be costly in computing resources and time consuming, limiting their usage in real-time implementations.

In contrast, the methods and systems described herein replace the costly and time-consuming methods with a faster machine learned super resolution method that has been trained to mimic the costlier methods. This machine learned super resolution method may fold the iterative processes used in the traditional methods into a single non-iterative forward propagation. A matching pair of low-resolution and high-resolution sensor images is used to accomplish this. In a non-limiting example, the low-resolution image can serve as input into an artificial neural network (ANN), and the high-resolution sensor image can serve as the desired output (e.g., ground truth) on which the network is trained. The machine learned super resolution method, as described herein, can use low-level radar data (e.g., time series, uncompressed data cube, lossless FFT) to capture all the information from a radar return, or, alternatively, thresholded data (e.g., detection level radar data) can be used.

The low-resolution image can be a data cube including multiple dimensions (e.g., a four-dimensional data cube having range, Doppler, azimuth angle, and elevation angle domains). Alternatively, the low-resolution image can be raw data before discrete Fourier transforms (DFT) are applied. This approach uses a parametric model-based localization to harness the information in the low-level radar data that is not available in the detection level radar data.

The high-resolution sensor image used as ground truth can be generated using traditional methods that may provide the desired resolution. Any number of iterations of the traditional methods may be selected as the traditional method only needs to be executed once per input data example for producing the high-resolution sensor image used for training the machine learned model.

In the example using the ANN model, the ANN model employs an encoder-decoder architecture. The input can be the low-level radar data as described above, and the output can be a high-resolution radar image that may closely approximate a high-resolution radar image that would be generated by the traditional methods using the same low-level radar data. At the inference stage, the trained ANN model can be executed in a feed-forward mode and, thus, may produce a super-resolved image quickly (e.g., adequate for real time applications).

Additionally, because radar data generally has lower resolution in the angular domains (e.g., azimuth domain, elevation domain), the methods and systems are described herein in context to super resolution in the angular dimensions. However, these methods and systems can be applied to any of the radar dimensions. In traditional photographic imagery, square filter kernels are generally used by convolutional neural networks (CNN) since both the horizontal and vertical dimensions are treated equally. In contrast, in some aspects, the machine learned super resolution method described herein may employ rectangular filter kernels of various sizes to emphasize one or both angular dimensions. Further, the super resolution can be performed along any subset of the four dimensions (e.g., two-dimensional range-azimuth image, two-dimensional range-elevation image, two-dimensional range-Doppler image, three-dimensional range-azimuth-elevation image).

The machine learned super resolution of radar data as described herein can obtain low-level information in all four radar dimensions from the low-level radar data, and, therefore, the machine learned model may be trained with more comprehensive information than can be obtained in detection level radar data. Using the low-level data to train the machine learned model according to the methods described in this disclosure may enable a radar system to better track objects over time since scatterers from the object that may fall below threshold detection levels can still be discerned and correlated over time.

Example Environments

FIG. 1 illustrates an example training environment 100 for machine-learning-based super resolution of radar data, in accordance with techniques of this disclosure. The example training environment 100 can be a controlled environment that a vehicle 102 including the radar system 104 uses to collect sensor data about the training environment 100. Alternatively, the radar system 104 may be statically mounted on a stand, mounted on a moving sled, or mounted in other ways in the training environment 100. In other examples, the radar system 104 can be any electromagnetic sensor or other sensor that may benefit from super resolving its data.

The training environment 100 can use the vehicle 102 equipped with the radar system 104 to collect radar data 110 related to an object 106 to be input into a super resolution model training system 108. The radar system 104 on the vehicle 102 collects low-level radar data, via a radar sensor, that may have higher resolution in some dimensions (e.g., range, Doppler) and lower resolution in other dimensions (e.g., azimuth angle, elevation angle). Radar images can be generated, based on the low-level radar data that includes multiple dimensions. Radar spectrum smears (e.g., due to radar leakage in side angular bins) in the radar image can be examples of the dimensions having lower resolution. This document uses a range-azimuth radar image to describe the techniques below for machine-learning-based super resolution of radar data; however, the techniques referred to below can apply to radar images with other dimensions.

The super resolution model training system 108 may include one or more processors (e.g., application processors, microprocessors, digital signal processors (DSP), or controllers) that are configured to execute computer-executable instructions stored within computer-readable storage media (e.g., non-transitory storage devices such as hard drives, solid state drives (SSD), flash memories, read-only memories (ROM), erasable programmable ROM (EPROM), or electrically erasable programmable ROM (EEPROM)) to cause the super resolution model training system 108 to perform the techniques described herein. The instructions may be part of operating systems and/or one or more applications of the super resolution model training system 108.

The super resolution model training system 108 can obtain the radar data 110 by over-the-air (OTA) means or by other methods from the vehicle 102. In other aspects, the super resolution model training system 108 may reside in the vehicle 102. A low-resolution image generator 112 can generate a low-resolution image 114 in multiple dimensions such as range-azimuth and is referred to as a low-resolution radar image because the azimuth dimension may have a lower resolution than the range dimension. In some aspects, the super resolution training system may receive the low-resolution image 114 directly from the radar system 104.

Likewise, a high-resolution image generator 116 can generate a high-resolution sensor image 118 that has been processed such that the resolution of the azimuth dimension and/or the range dimension has been increased to a desired level. To accomplish this, the high-resolution image generator 116 may use a traditional method (e.g., IAA) that includes time consuming and computing resource consuming calculations but provides the desired level of resolution for the high-resolution sensor image 118. Using the traditional method may be acceptable for this task since the training is executed as a training application and not a real time application. In other aspects, continuous training and regular updates to an already trained super resolution model may take place in parallel to using the already trained super resolution model in a real time application.

The low-resolution image 114 is received by a machine learning module 120 and used as input data for training the super resolution model. The high-resolution sensor image 118 is received by the machine learning module 120 and is used as ground truth for training the super resolution model. The super resolution model may be an ANN that is based on a deep neural network architecture suitable for outputting super-resolved images such as a convolutional neural network (CNN). In some aspects, the super resolution model may use an encoder decoder architecture that includes an input layer, an output layer, one or more convolutional layers, one or more down-sampling layers, and one or more up-sampling layers. The CNN may use a filter kernel that is adapted to increase the resolution of one or more dimensions of the input low-resolution image 114. That is, instead of a square kernel filter (e.g., X by X matrix) that is traditionally used in photographic images, the kernel filter may be a rectangular matrix (e.g., X by Y matrix, where X≠Y) that effectively increases the resolution of at least one of the dimensions. In other aspects, other training methods may be employed such as using a general adversarial network (GAN) to train the super resolution model.

The machine learning module 120 outputs a trained super resolution model 122. In some aspects, the operations associated with the super resolution model training system 108 can be performed using a different arrangement or quantity of components than that shown in FIG. 1. The trained super resolution model 122 can be deployed to real time applications for the inference stage. The trained super resolution model 122 can operate in a feed forward mode, and, therefore, may use much fewer computing resources than traditional super resolution methods. Because the trained super resolution model 122 has been trained to mimic a time-consuming iterative process with less time-consuming matrix calculations, the super resolution model may be ideal for certain real time applications such as detecting and tracking objects in automotive systems, classification, segmentation, and various perception tasks.

Figure 2:
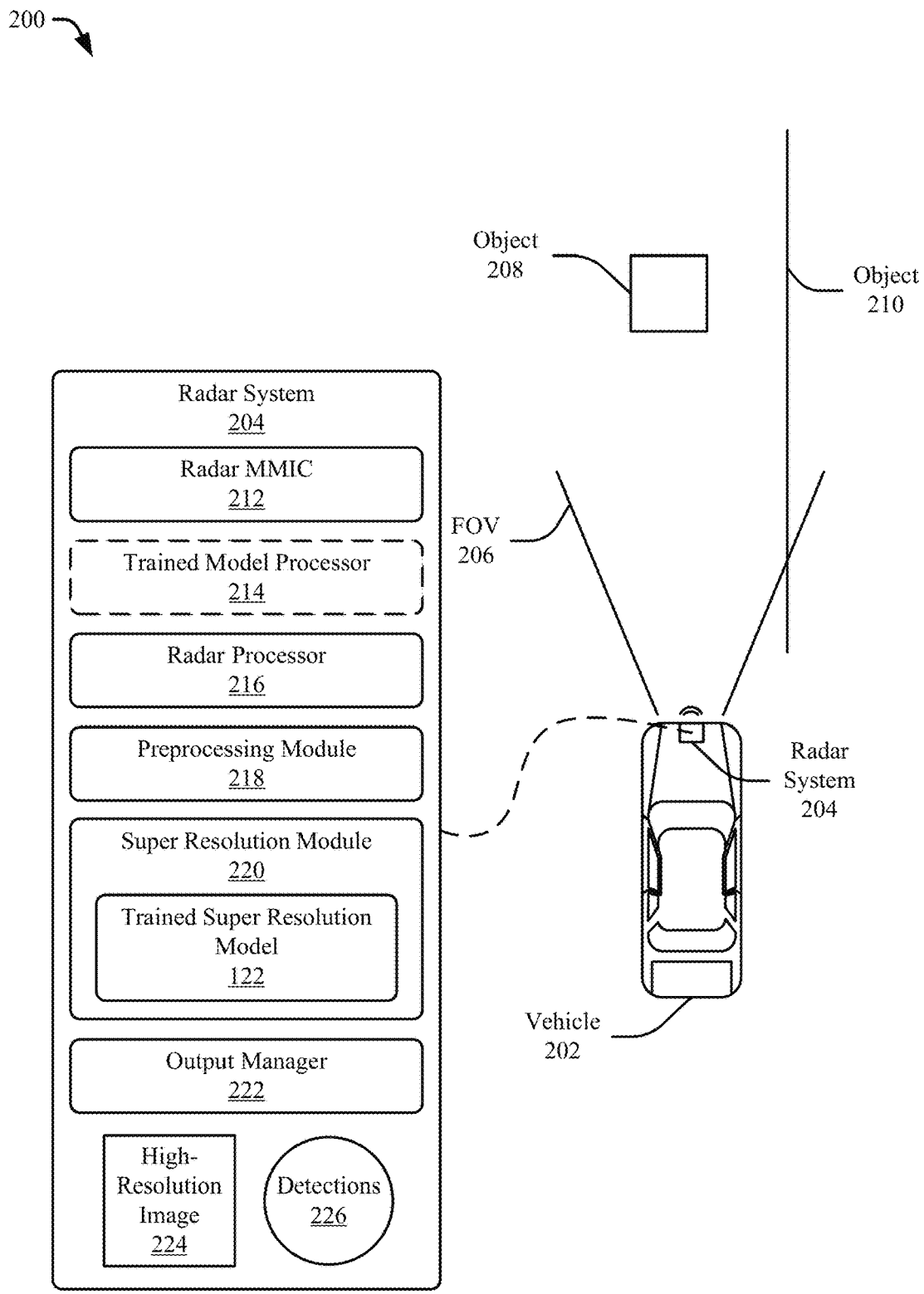
FIG. 2 illustrates an example environment in which machine-learning-based super resolution of radar data can be applied, in accordance with techniques of this disclosure.

FIG. 2 illustrates an example environment 200 in which machine-learning-based super resolution of radar data can be applied, in accordance with techniques of this disclosure. In the depicted environment 200, a vehicle 202 travels on a roadway by at least partially relying on output from a radar system 204. Although illustrated as a passenger car, the vehicle 202 can represent other types of motorized vehicles (e.g., truck, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like.

The radar system 204 can be installed on, mounted to, or integrated with any moving platform, including moving machinery or robotic equipment. Components of the radar system 204 can be arranged in a front, back, top, bottom, or side portion of the vehicle 202, within a bumper, integrated into a side mirror, formed as part of a headlight and/or taillight, or at any other interior or exterior location where objects require detection. The vehicle 202 may include multiple radar systems 204, such as a first radar system and a second radar system, to provide a custom field-of-view 206 that encompasses a particular region of interest outside the vehicle 202. Acting as part of a perception system of the vehicle 202, the radar system 204 aids in driving the vehicle 202 by enabling advanced safety or autonomous driving features. Vehicle subsystems may rely on the radar system 204 to detect whether any objects (e.g., objects 208 and 210) appear in the environment 200 within a particular field of view (FOV) 206.

The radar system 204 is configured to detect the objects 208 and 210 by radiating the objects 208 and 210 within the field of view 206. For example, the object 208 can be a stationary or moving object and includes one or more materials that reflect radar signals. The objects 208 and 210 may be another vehicle, a traffic sign, a barrier, an animal, a pedestrian, or any other object or debris.

The radar system 204 can include a combination of hardware components and software components executing thereon. For example, a non-transitory computer-readable storage media (CRM) of the radar system 204 may store machine-executable instructions that, when executed by a processor of the radar system 204, cause the radar system 204 to output information about objects detected in the field of view 206. As one example, the radar system 204 includes a signal processing component that may include a radar monolithic microwave integrated circuit (MMIC) 212, a trained model processor 214, and a radar processor 216. The radar MIMIC 212, the trained model processor 214, and the radar processor 216 may be physically separated components, or their functionality may be included within a single integrated circuit. Other processors may, likewise, be present in some aspects. In this example, the radar system 204 also includes a preprocessing module 218, a super resolution module 220, and an output manager 222. In some aspects, the super resolution module 220 can be stored on a CRM of another system. In other examples, the operations associated with the radar system 204 can be performed using a different arrangement or quantity of components than that shown in FIG. 2. These components receive radar signals to generate a high-resolution radar image 224 and detections 226. The high-resolution radar image 224 and the detections 226 can be used to update object tracks and classify objects.

For example, the radar MMIC 212 may receive low-level radar signals from the radar system 204 that were transmitted by the radar system 204 and reflected from the objects 208 and 210. The low-level radar signals can be preprocessed (e.g., lossless FFT, uncompressed data cube) without loss of data by the preprocessing module 218 to generate a low-resolution sensor image (not shown), and the low-resolution sensor image can be input into the super resolution module 220 being executed by the trained model processor 214. In other aspects, the super resolution module 220 can receive the low-level radar data directly from the MMIC 212. A high-resolution sensor image 224 based on the low-resolution sensor image can be generated by the trained super resolution model 122 that has higher resolution in at least one of the dimensions of the high-resolution sensor image 224 than in the low-resolution sensor image. The detections 226 can be determined from the high-resolution sensor image 224. The high-resolution sensor image 224 can be output to other modules (e.g., a detection module, a tracking module being executed by the radar processor 214) that may be a part of the radar system 204. The output manager 222 can output the high-resolution sensor image 224 and the detections 226 to other systems of the vehicle 202 for automotive and safety applications. In this manner, the high-resolution sensor image 224 and the detections 226 may include relevant information included in the low-level radar data but lower the quantity of false detections that the radar system 204 may have reported without using the trained super resolution model 122.

Example Systems

Figure 3:
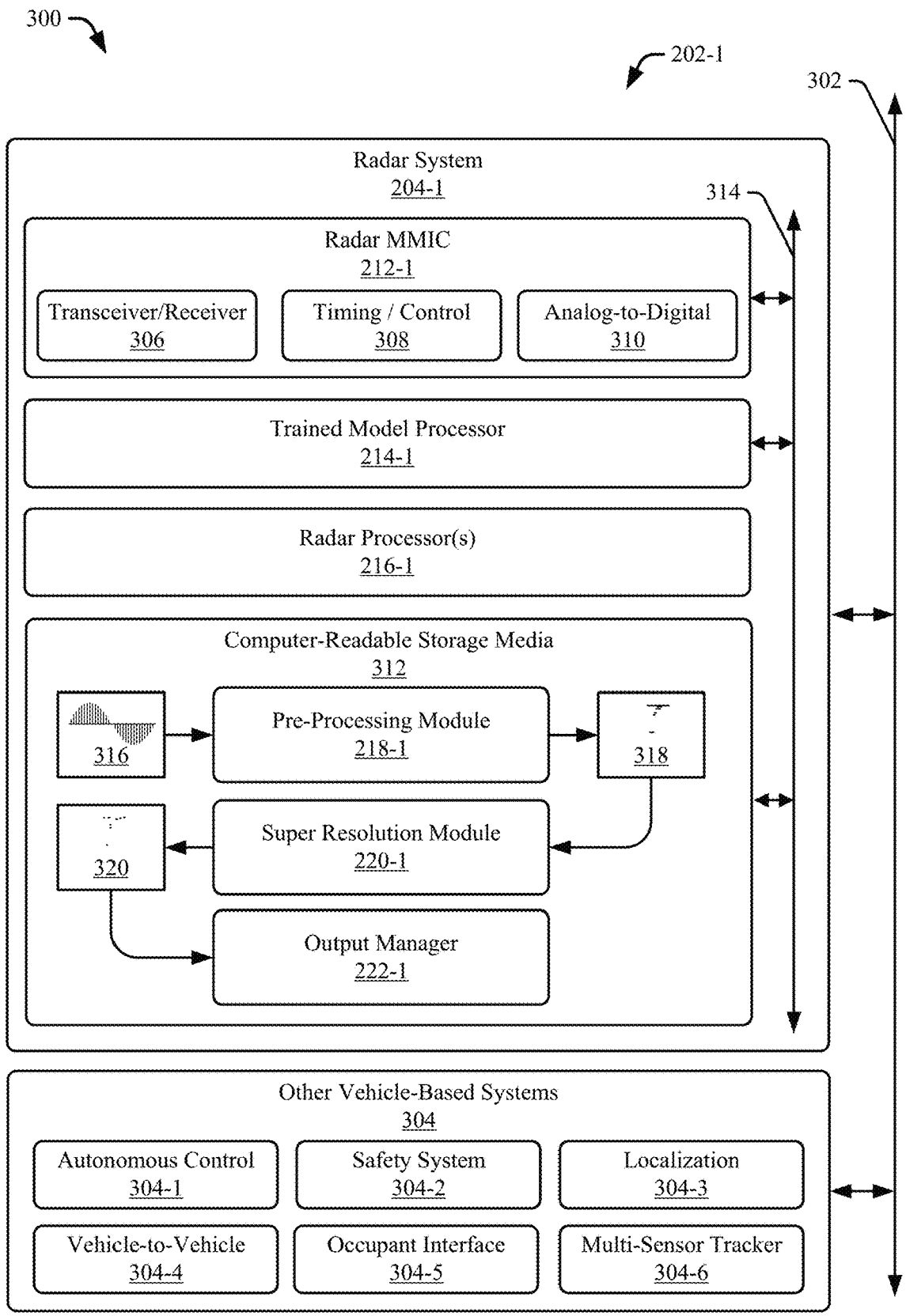
FIG. 3 illustrates an example vehicle including a system configured to utilize a model trained using machine-learning-based super resolution of radar data, in accordance with techniques of this disclosure.

FIG. 3 illustrates an example vehicle 202-1 including a system configured to utilize a model trained using machine-learning-based super resolution of radar data, in accordance with techniques of this disclosure. The vehicle 202-1 is an example of the vehicle 202. Included in the vehicle 202-1 is a radar system 204-1, which is an example of the radar system 204. The vehicle 202-1 further includes a communication link 302 that the radar system 204-1 can use to communicate to other vehicle-based systems 304. The communication link 302 may be a wired or wireless link and, in some cases, includes a communication bus (e.g., CAN bus). The other vehicle-based systems 304 perform operations based on information received from the radar system 204-1, over the link 302, such as data output from the radar system 204-1, including information indicative of one or more objects identified and tracked in the FOV.

The radar system 204-1 includes a radar MMIC 212-1, a trained model processor (e.g., embedded processor for machine learned models) 214-1, and a radar processor 216-1, similar to the radar system 204. The radar MMIC 212-1 includes one or more transceivers/receivers 306, timing/control circuitry 308 and analog-to-digital converters (ADC) 310.

The radar system 204-1 further includes a non-transitory computer-readable storage media (CRM) 312 (e.g., a memory, long-term storage, short-term storage), which stores instructions for the radar system 204-1. The CRM 312 stores a preprocessing module 218-1, a super resolution module 220-1, and an output manager 222-1. Other instructions, relevant to the operation of the radar system 204-1 may, likewise, be stored in the CRM 312. The components of the radar system 204-1 communicate via a link 314. For example, the preprocessing module 218-1 receives low-level radar data 316 from the MMIC 212-1 over the link 314 and instructions from the CRM 312 to generate a low-resolution image 318 that includes all the information from the low-level radar data 316. The trained model processor 214-1 receives the low-resolution image 318 over the link 314 and instructions from the CRM 312 to execute the super resolution module 220-1.

The super resolution module 220-1 executes a model (e.g., the trained super resolution model 122) trained to perform machine-learning-based super resolution of radar data, in accordance with the techniques described in this disclosure. The trained model generates a high-resolution sensor image 320. The trained model may be periodically updated via over-the-air (OTA) updates, during routine maintenance, or by other methods.

The radar processor 216-1 can retrieve the high-resolution sensor image 320 from the CRM 312. The radar processor 216-1 can also use the high-resolution sensor image 320 to determine detections. The radar processor 216-1 also receives instructions from the CRM 312 to execute the output manager 222-1 over the link 314. The output manager 222-1 distributes the high-resolution sensor image to modules stored in the CRM 312 that perform other radar tasks, including radar detection and tracking functions. The high-resolution sensor image 320 may enable the radar system to report less false positive detections. The high-resolution sensor image 320 is made available by the output manager 222-1 to the other vehicle-based systems 304. Detections based on the high-resolution sensor image 320 may also be made available to the other vehicle-based systems 304.

The other vehicle-based systems 304 can include autonomous control system 304-1, safety system 304-2, localization system 304-3, vehicle-to-vehicle system 304-4, occupant interface system 304-5, multi-sensor tracker 304-6, and other systems not illustrated. Objects in the FOV can be inferred and classified based on the high-resolution sensor image 320, and this information can be output to the other vehicle-based systems 304. In this manner, the other vehicle-based systems 304 can receive an indication of one or more objects detected by the radar system 204-1 in response to the radar system 204-1 combining and analyzing the radar data 316 generated by the received signals. The other vehicle-based systems 304 may perform a driving function or other operation that may include using output from the radar system 204-1 to assist in determining driving decisions. For example, the autonomous control system 304-1 can provide automatic cruise control and monitor the radar system 204-1 for output that indicates the presence of objects in the FOV, for instance, to slow the speed and prevent a collision with an object in the path of the vehicle 202-1. The safety system 304-2 or the occupant interface system 304-5 may provide alerts or perform a specific maneuver when the data obtained from the radar system 204-1 indicates that one or more objects are crossing in front of the vehicle 202-1.

Example Implementations

Figure 4:
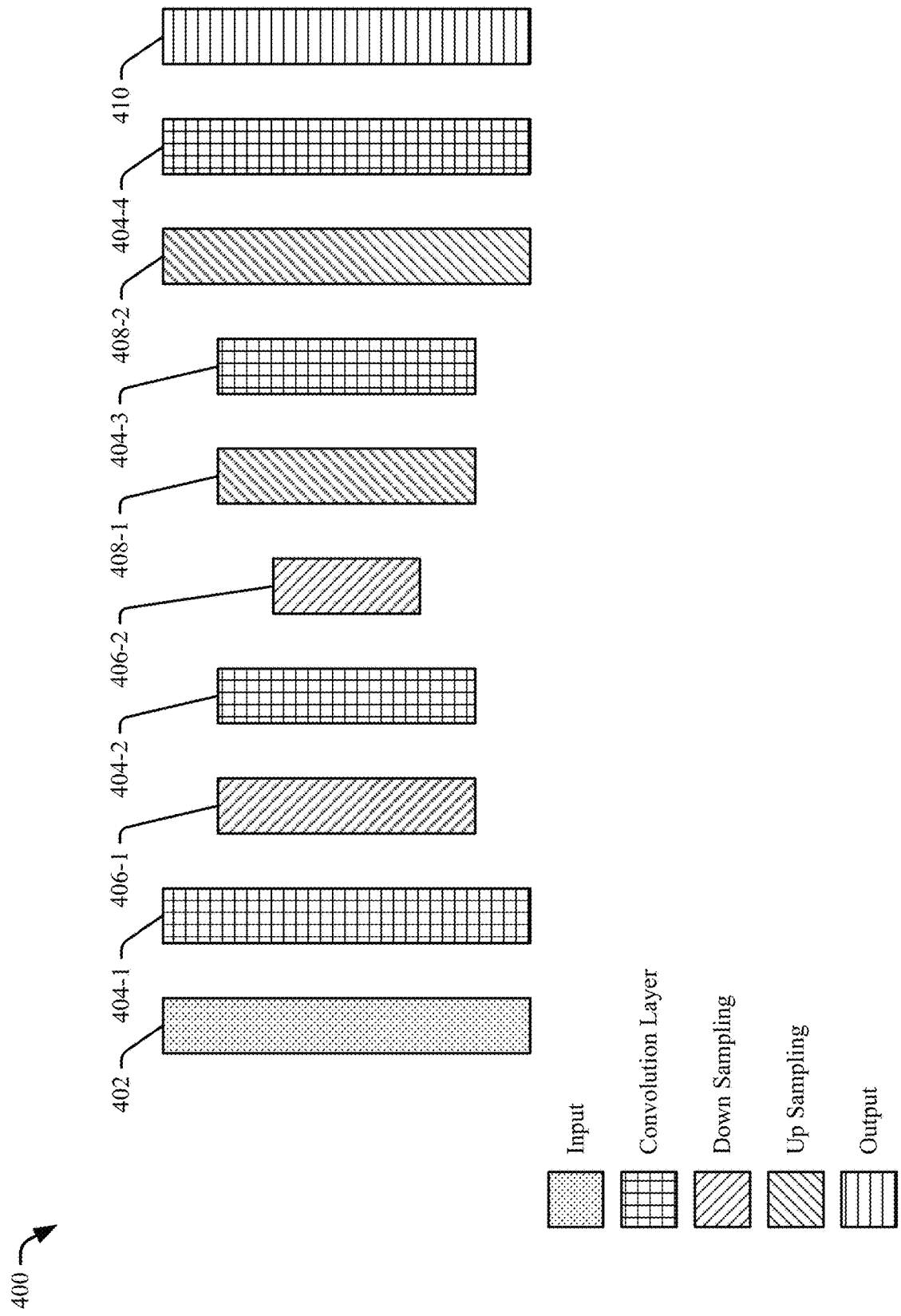
FIG. 4 illustrates an example model used for machine-learning-based super resolution of radar data, in accordance with techniques of this disclosure.

FIG. 4 illustrates an example model 400 used for machine-learning-based super resolution of radar data, in accordance with techniques of this disclosure. Aspects of the example model 400 use an encoder decoder architecture including an input layer 402, a first convolution layer 404-1, a first down-sampling layer 406-1, a second convolution layer, 404-2, a second down-sampling layer 406-2, a first up-sampling layer 408-1, a third convolution layer 404-3, a second up-sampling layer 408-2, a fourth convolution layer 404-4, and an output layer 410. However, other aspects of the example model may include none of these layers, or one or more of any of these layers, or any combination thereof in any order. Further, other layers may be included or excluded, or other machine learning architectures may be used.

The input layer 402 of the example model 400 may include a single input channel that receives absolute values of the magnitudes of radar data (e.g., sensor data magnitudes. The radar data can be low-level radar data that is unprocessed radar data as received by a MMIC of a radar system (e.g., the radar system 104, 204, 204-1), or the radar data can be low-level radar data that is preprocessed, for example, as an uncompressed multi-dimensional data cube, a beam vector, or a low-resolution radar image. The preprocessed low-level radar data retains all the information that is in the unprocessed low-level radar data. In some aspects, the radar data can be compressed radar data such as a compressed data cube or thresholded radar data.

In some aspects, the input layer 402 can include two or more input channels. One input channel can receive the magnitudes of the low-level radar data and another input channel can receive the phases of the low-level radar data (e.g., the imaginary portion of the radar data after an FFT has been applied to the radar data). In other aspects, the input layer 402 can include more than two input channels. For example, if a radar system has a sparse array of receive channels (e.g., receive antennas) and a dense array of receive channels, a first input channel of the input layer 402 can receive the magnitudes of the low-level radar data received by the sparse array; a second channel can receive the phases of the low-level radar data received by the sparse array; a third channel can receive the magnitudes of the low-level radar data received by the dense array; and a fourth channel can receive the phases of the low-level radar data received by the dense array. Using two or more input channels may enable super resolution of radar data for radar systems with wide FOVs to be performed efficiently. In other aspects, using a general adversarial network may, likewise, enable super resolution of radar data for radar systems with wide FOVs.

The first convolutions layer 404-1 of the example model 400 receives the radar data from the input layer 402 and performs feature extraction functions on the inputted radar data. The first convolution layer 404-1 (and the other convolutions layers 404) uses a rectangular filter kernel to compensate for a lower resolution in at least one of the dimensions (e.g., azimuth angle, elevation angle) included in the radar data. The first convolution layer 404-1 outputs to the first down-sampling layer 406-1. The first down-sampling layer 406-1 down samples (e.g., discards information not related to the extracted features) the radar data and outputs to the second convolution layer 404-2. After the second convolution layer 404-2 convolves the down sampled radar data, the second convolution layer 404-2 outputs to the second down-sampling layer 406-2. The down-sampling layer 406-2 further down samples the radar data and outputs to the first up-sampling layer 408-1. The first up-sampling layer 408-1 up samples the down sampled radar data and outputs to the third convolution layer 404-3. The third convolution layer 404-3 convolves the up sampled radar data and outputs to the second up-sampling layer 408-2. The second up-sampling layer further up samples the radar data and outputs to the fourth convolution layer 404-4. The fourth convolution layer 404-4 convolves the up sampled radar data and outputs to the output layer 410. The output of the model is high resolution radar data (e.g., a high-resolution sensor image, a high resolution multi-dimensional data cube) where the resolution in at least one of the dimensions is higher than in the input radar data. In this manner, the model may be trained to output a high-resolution sensor image that closely approximates a radar image (e.g., the ground truth) generated by a time intensive iterative algorithm in a fraction of the time needed by the iterative algorithm to produce the high-resolution sensor image. In the inference stage, a model trained in this manner can output a high-resolution sensor image that may be used to accurately infer, classify, and track objects in the field of view of the radar system.

Figure 5:
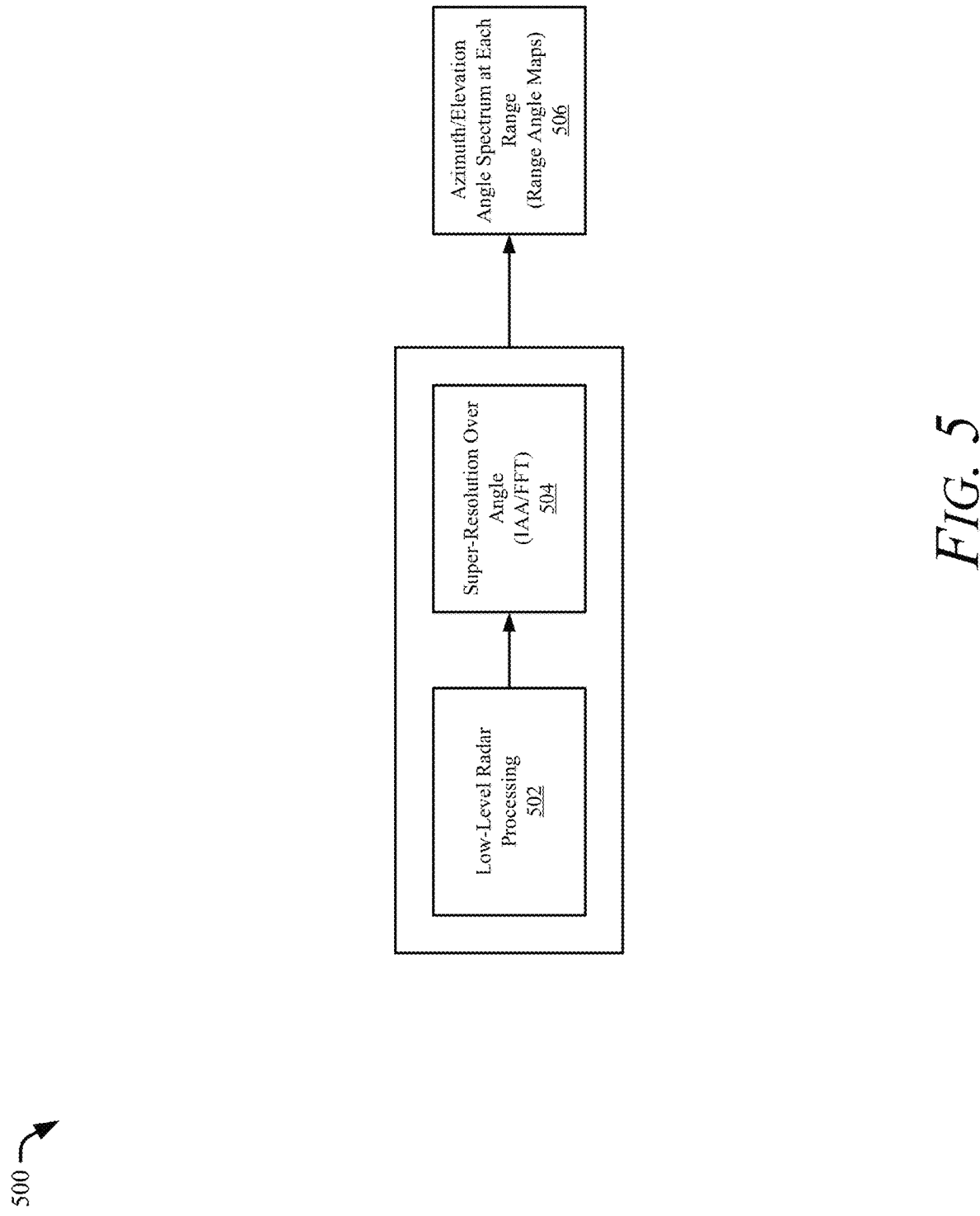
FIG. 5 illustrates a flow chart of an example system configured for machine-learning-based super resolution of radar data, in accordance with techniques of this disclosure.

FIG. 5 illustrates a flow chart 500 of an example system configured for machine-learning-based super resolution of radar data, in accordance with techniques of this disclosure. At step 502, low-level radar data is input into the system and any desired preprocessing is performed on the low-level radar data. The preprocessing may include any lossless function such as applying a lossless FFT on the low-level radar data or forming the low-level radar data into an uncompressed data cube. The output can be a low-resolution radar image (e.g., having lower resolution in one or more of the angular dimensions) such as a range-azimuth image or a range-elevation image. Any dimensions of the low-level radar data may be represented in the output low-resolution radar image.

At step 504, a machine learning model trained for super resolution of radar data converts the low-resolution radar image into a high-resolution sensor image (e.g., having higher resolution in one or more of the angular dimensions than the low-resolution radar image). In this example, the model is trained using a rectangular filter to increase the resolution of the angular dimension present in the low-resolution radar image.

At step 506, super-resolved range-angle maps are output. The resolution in the angle dimension (e.g., azimuth angle, elevation angle) has been increased removing noise caused by sidelobes inherit in the radar system.

Figure 6:
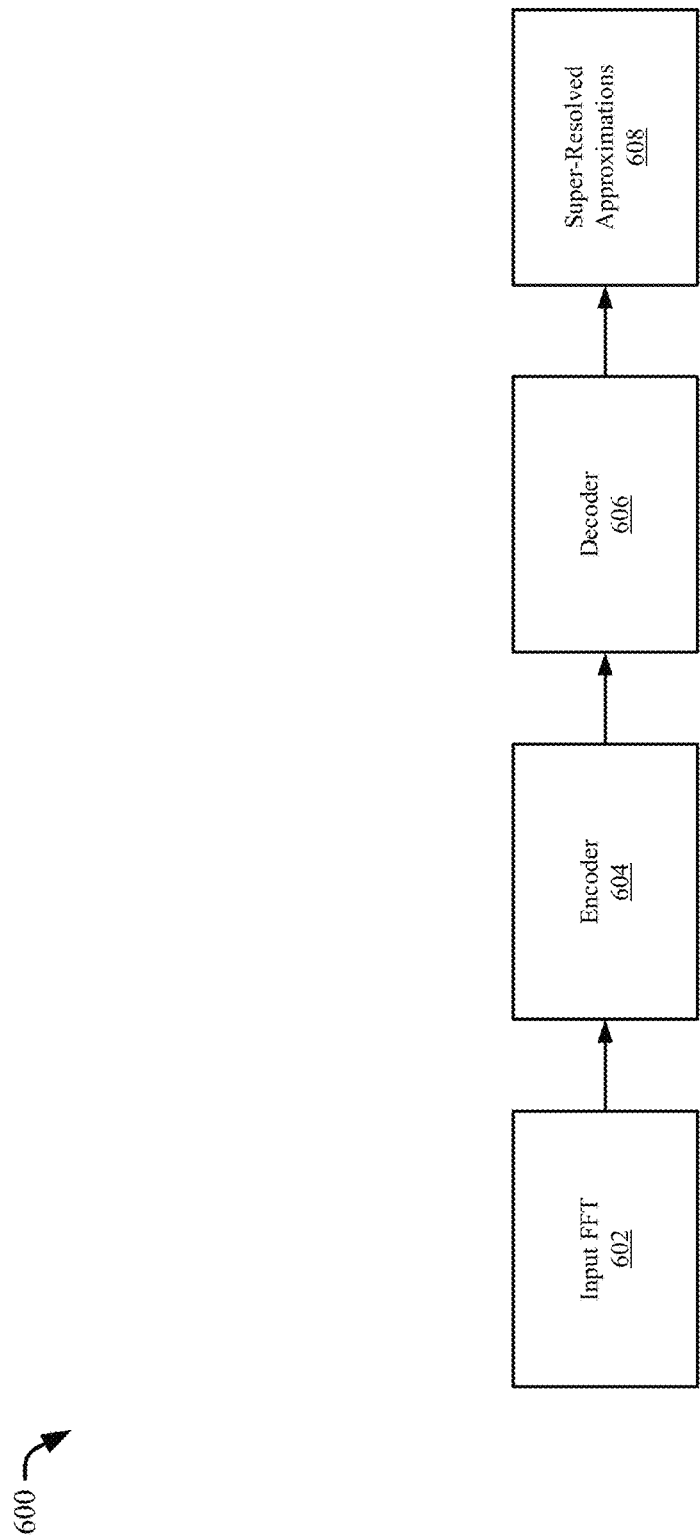
FIG. 6 illustrates an example model pipeline configured for machine-learning-based super resolution of radar data, in accordance with techniques of this disclosure.

FIG. 6 illustrates an example model pipeline 600 configured for machine-learning-based super resolution of radar data, in accordance with techniques of this disclosure. This example model pipeline has an encoder decoder architecture (e.g., the example model 400).

The training and inferences stages of the model include determining a set of beam vectors (e.g., the low-level radar data preprocessed to consider the physical properties and spacing of the receive channels of the radar system) encompassing all the ranges and Doppler bins derived from the low-level radar data. A subset of the beam vectors including the desired Doppler bins at all the range bins is selected. At 602, an FFT may be applied across all the range bins of the subset of beam vectors to obtain range-angle maps and input into the model. At 604, the range-angle maps (e.g., range angle radar images, range-azimuth radar images, range, elevation radar images) are fed into the encoder side of the model. At 606, from the decoder side of the model, super-resolved approximations 608 of desired high-resolution sensor images are output. Desired high-resolution sensor images may be generated from time consuming iterative methods. During the training stage, the super-resolved radar approximations 608 can be compared to the desired high-resolution sensor images, and an error can be calculated between the desired high-resolution sensor images and the super-resolved approximations 608. The error can be used to further train the model. During the inference stage, the model can output the super-resolved approximations 608 of the low-level radar data input that predict the desired high-resolution sensor images, circumventing the need for the time-consuming iterative methods and resulting in detecting targets with minimum sidelobe interference.

Figures 1, 7:
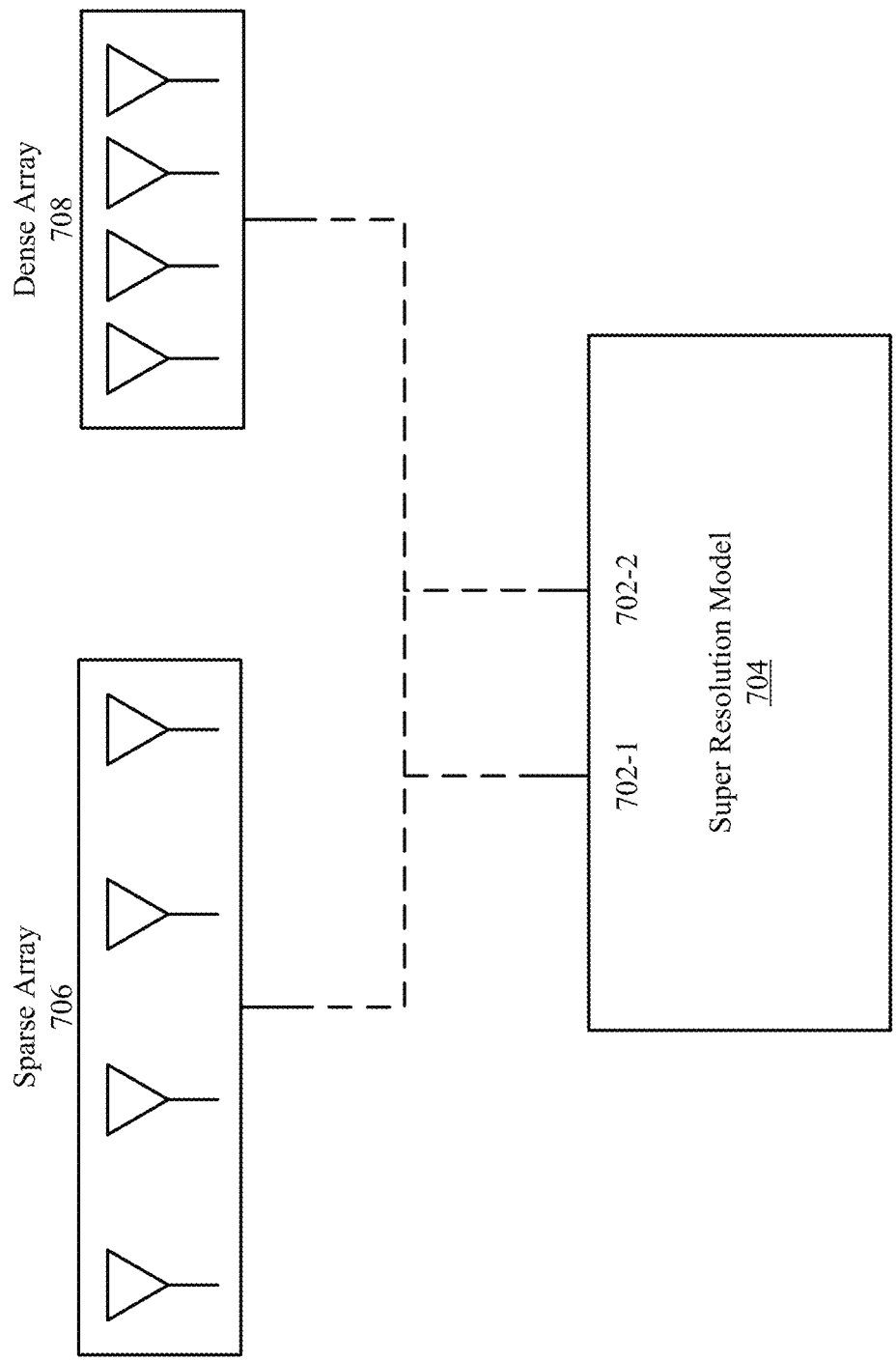
Figures 2, 7:
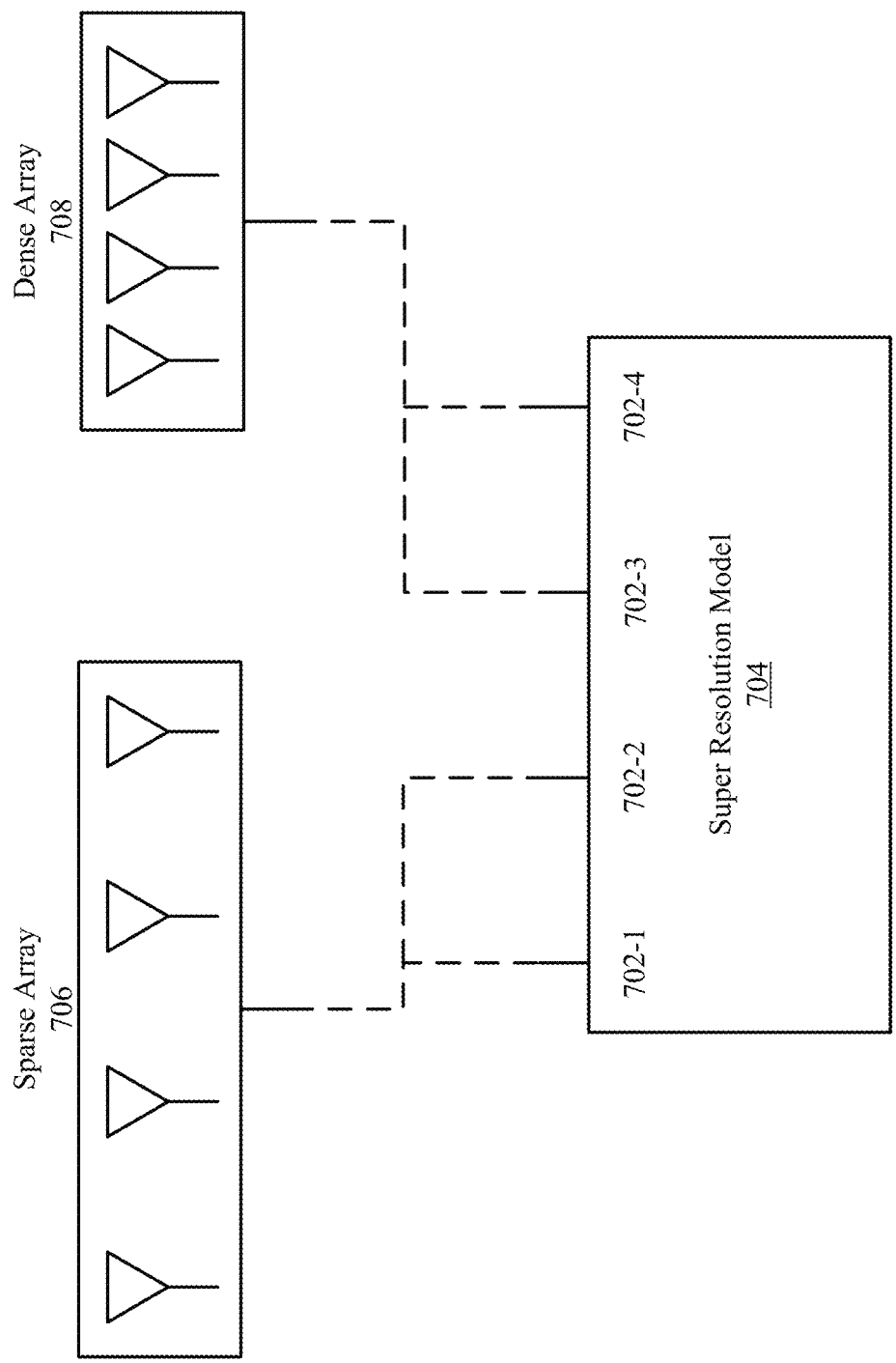

FIGS. 7-1 and 7-2 illustrate multiple input channels 702 to a super resolution model 704 configured for machine-learning-based super resolution of radar data, in accordance with techniques of this disclosure. In FIG. 7-1, radar signals are received by a sparse array 706 and a dense array 708 of receive channels (e.g., receive antennas). Beam vectors derived from the received radar signals can have magnitudes (e.g., real portion of a complex number representing a beam vector after an FFT is applied) and phases (e.g., imaginary portion of the complex number representing a beam vector after the FFT is applied). The magnitudes of the beam vectors, based on the received radar signals from both the sparse array 706 and the dense array 708, are input into input channel 702-1. The phases of the beam vectors are input into input channel 702-2. Although, the information about the localization of an object is included in a given beam vector, the localization may not be obvious when analyzing the beam vector because the energy of the objects on the road is evenly distributed. Using a Discrete Fourier Transform (DFT) by applying the FFT (or IAA) localizes this energy at a particular angle. Additionally, the model may use a higher filter size that is closer to (e.g., approximates) the input and can capture more of the useful features in the radar data. In this manner, additional information contained in the phases of the beam vectors can be captured.

Likewise, in FIG. 7-2, radar signals are received by the sparse array 706 and the dense array 708. In this example, the magnitudes of the beam vectors, based on the radar signals received by the sparse array 706, are input into input channel 702-1, and the phases of the beam vectors, based on the radar signals received by the sparse array 706, are input into input channel 702-2. The magnitudes and the phases of the beam vectors associated with the dense array 708 are input into input channel 702-3 and 702-4, respectively. The magnitudes of the beam vectors are bounded, either on a decibel scale or by other methods. Further, during training, the FFT values, based on applying the FFTs to the beam vectors to be input into the channels 702, can be feature scaled with the desired IAA values. Machine-learning-based up-sampling and modifications to a loss function may capture the sparsity in the information derived from the received radar signals. In this manner, a lower point FFT may be used to generate a high-resolution sensor image from a lower resolution radar image.

Example Methods

Figure 8:
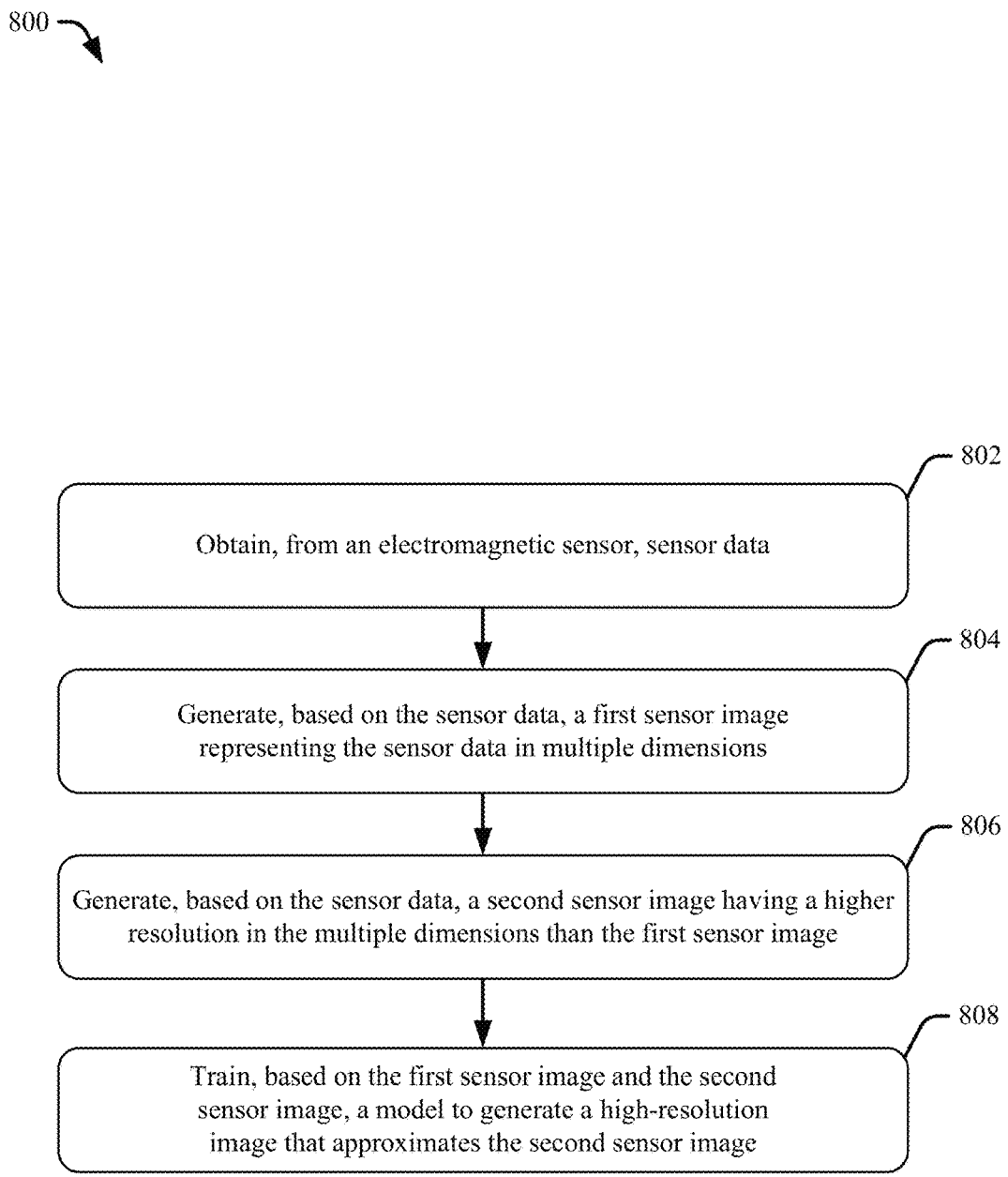
FIG. 8 illustrates an example method for training a model configured for machine-learning-based super resolution of radar data, in accordance with techniques of this disclosure.

FIG. 8 illustrates an example method 800 for training a model configured for machine-learning-based super resolution of radar data, in accordance with techniques of this disclosure. Method 800 is shown as sets of operations (or acts) performed, but not necessarily limited to the order or combinations in which the operations are shown herein. Further, any of one or more of the operations may be repeated, combined, or reorganized to provide other methods. At step 802, sensor data is obtained from an electromagnetic sensor. The sensor data is low-level radar data such as time series, lossless FFT, or an uncompressed data cube.

At step 804, a first sensor image representing the sensor data in multiple dimensions is generated. As an example, if the sensor is a radar sensor, the multiple dimensions can include range, Doppler, azimuth angle, and elevation angle. The first sensor image can be a multi-dimensional map of any combination of these dimensions. Generally, the angular dimensions have less resolution than the range and Doppler dimensions. The low resolution in the map often appears an energy spectrum smear as opposed to a sharper, more recognizable point in a higher resolution map. Range-azimuth maps and range-elevation maps may be useful for detecting objects.

At step 806, a second sensor image having a higher resolution in at least one of the multiple dimensions is generated based on the sensor data. The second sensor image can be generated by traditional methods, such as IAA, that can produce a high-resolution sensor image but does so at a great expense of time and computing resources.

At step 808, a machine-learning-based model is trained to generate a high-resolution sensor image that closely approximates the second sensor image. To train the model (e.g., super resolution model), the first sensor image is provided as input, and the second sensor image is taken as ground truth. The model can be a neural network suitable for image classification, such as a CNN-based network, or it can be based on other types of machine learning such as a GAN model. Because the executable of the trained model can be very small relative to the executables of IAA and other traditional techniques, the trained model may be suitable for real-time applications such as automotive-based radar systems. The high-resolution sensor image generated by the trained model may accurately assist other radar functions or other systems to accurately detect and track objects and minimize false detections reported by the radar system. Additionally, the high-resolution sensor image may enable objects in close proximity to one another to be distinguished and detected.

ADDITIONAL EXAMPLES

Some additional examples for machine-learning-based super resolution of radar data are provided below.

Example 1: A method comprising: obtaining, from an electromagnetic sensor, sensor data; generating, based on the sensor data, a first sensor image representing the sensor data in multiple dimensions; generating, based on the sensor data, a second sensor image having a higher resolution in at least one of the multiple dimensions than the first sensor image; training, by machine learning and based on the first sensor image being used as input data and the second sensor image being used as ground truth data, a model to generate a high-resolution sensor image that approximates the second sensor image, the generated high-resolution sensor image capable of being used for at least one of detecting objects, tracking objects, classification, or segmentation.

Example 2: The method of example 1, wherein the model being trained comprises at least one artificial neural network.

Example 3: The method of any one of the preceding examples, wherein the model further comprises one or more down-sampling layers and one or more up-sampling layers.

Example 4: The method of any one of the preceding examples, wherein at least one of the at least one artificial neural network is a convolutional neural network including one or more down-sampling layers, one or more up-sampling layers, and one or more convolution layers.

Example 5: The method of any one of the preceding examples, wherein a rectangular filter kernel, configured to compensate for a lower resolution in one of the multiple dimensions, is used to train the model.

Example 6: The method of any one of the preceding examples, wherein the model comprises: an input layer configured to receive the first sensor image as input data and the second sensor image as ground truth data; a first convolution layer configured to receive an output of the input layer as input; a first down-sampling layer configured to receive an output of the first convolution layer as input; a second convolution layer configured to receive an output of the first down-sampling layer as input; a second down-sampling layer configured to receive an output of the second convolution layer as input; a first up-sampling layer configured to receive an output of the second down-sampling layer as input; a third convolution layer configured to receive an output of the first up-sampling layer as input; a second up-sampling layer configured to receive an output of the third convolution layer as input; a fourth convolution layer configured to receive an output of the second up-sampling layer as input; and an output layer configured to receive an output of the fourth convolution layer as input and output the generated high-resolution sensor image.

Example 7: The method of any one of the preceding examples, wherein: the input data is based on the absolute values of sensor data magnitudes in the multiple dimensions; and absolute values of the sensor data magnitudes are input into the model via a single input channel.

Example 8: The method of any one of the preceding examples, wherein the electromagnetic sensor is a radar system.

Example 9: The method of any one of the preceding examples, wherein the multiple dimensions comprise at least two of: a range domain; a Doppler domain; an azimuth angle domain; or an elevation angle domain.

Example 10: The method of any one of the preceding examples, wherein generating the first sensor image comprises: determining, based on the sensor data, a set of beam vectors that encompasses all range bins and Doppler bins associated with the sensor data; and selecting a subset of beam vectors, including a set of Doppler bins at all range bins, from the beam vectors that encompass all the range bins and Doppler bins; and obtaining, based on the subset of beam vectors, a range-angle map.

Example 11: The method of any one of the preceding examples, wherein: the set of beam vectors are derived from data received by sparse receive channels and dense receive channels of the radar sensor; the input data is based on magnitudes and phases of the subset of beam vectors received by the sparse and the dense receive channels; the magnitudes of the beam vectors received by the sparse and the dense receive channels are input on a first channel of the model; the phases of the beam vectors received by the sparse and the dense receive channels are input on a second channel of the model; and training the model further comprises using a deep neural network and a filter kernel configured to capture features of the input data.

Example 12: The method of any one of the preceding examples, further comprising applying a Fast Fourier Transform (FFT) to the subset of beam vectors, and wherein: the set of beam vectors are derived from data received by sparse receive channels and dense receive channels of the radar sensor; the input data is based on magnitudes and phases of the subset of beam vectors received by the sparse and the dense receive channels; the magnitudes of the beam vectors received by the sparse receive channels are input on a first channel of the model; the phases of the beam vectors received by the sparse receive channels are input on a second channel of the model; the magnitudes of the beam vectors received by the dense receive channels are input on a third channel of the model; and the phases of the beam vectors received by the dense receive channels are input on a fourth channel of the model.

Example 13: The method of any one of the preceding examples, wherein the magnitudes of the subset of beam vectors are bounded.

Example 14: The method of any one of the preceding examples, wherein the model is trained using a general adversarial network.

Example 15: The method of any one of the preceding examples, wherein training the model comprises: comparing the generated high-resolution sensor image to the second sensor image; calculating, based on comparing the generated high-resolution sensor image to the second sensor image, an error for the generated high-resolution sensor image; and further training the model based on the error.

Example 16: The method of any one of the preceding examples, wherein the second sensor image is generated based on an iterative adaptive algorithm.

Example 17: A system comprising at least one processor configured to train a model in accordance with any one of the preceding examples.

Example 18: A system comprising means to for performing the method of any one of the previous examples.

Example 19: A computer-readable memory including instructions that, when executed, cause a processor to train a model by the method of any one of the previous examples.

Example 20: A system comprising: a radar sensor; a trained model trained to generate a high-resolution sensor image according to any one of the previous examples; at least one processor configured to: receive, from the radar sensor, radar data; determine, based on the radar data, a set of beam vectors derived from the radar data that encompasses all range bins and Doppler bins associated with the sensor data; select a subset of the beam vectors, including a set of Doppler bins at all range bins, from the beam vectors that encompass all the range bins and Doppler bins; apply a Fast Fourier Transform (FFT) to the subset of beam vectors; input, into the trained model, magnitudes of the subset of beam vectors into at least a first channel of the model; input, into the trained model, phases of the subset of beam vectors into at least a second channel of the model; receive, from the trained model, the generated high-resolution sensor image; and output the generated high-resolution sensor image for at least one of detecting objects, tracking objects, classification, or segmentation.

Example 21: A system comprising a model trained by performing the method of any one of the previous examples.

Example 22: A computer-readable memory including instructions that, when executed, cause a processor to perform super resolution of sensor data by executing a model trained by the method of to any one of the previous examples.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with electromagnetic energy resolution can occur in other systems. Therefore, although described as a way to super resolve radar data, the techniques of the foregoing description can be applied to other systems that would benefit from high resolution data. Further, these techniques may also be applied to other electromagnetic data that may be super resolved.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising: obtaining, from an electromagnetic sensor, sensor data; generating, based only on the sensor data, a first sensor image representing the sensor data in multiple dimensions; generating, based only on the sensor data, a second sensor image having a higher resolution in at least one of the multiple dimensions than the first sensor image; and training, by machine learning and based on the first sensor image being used as input data and the second sensor image being used as ground truth data, a model to generate a high-resolution sensor image that approximates the second sensor image, the generated high-resolution sensor image used for at least one of detecting objects, tracking objects, classification, or segmentation.

2. The method of claim 1, wherein the model being trained comprises at least one artificial neural network.

3. The method of claim 2, wherein the model further comprises one or more down-sampling layers and one or more up-sampling layers.

4. The method of claim 2, wherein at least one of the at least one artificial neural network is a convolutional neural network including one or more down-sampling layers, one or more up-sampling layers, and one or more convolution layers.

5. The method of claim 4, wherein a rectangular filter kernel, configured to compensate for a lower resolution in one of the multiple dimensions, is used to train the model.

6. The method of claim 4, wherein the model comprises:
an input layer configured to receive the first sensor image as input data and the second sensor image as ground truth data;
a first convolution layer configured to receive an output of the input layer as input;
a first down-sampling layer configured to receive an output of the first convolution layer as input;
a second convolution layer configured to receive an output of the first down-sampling layer as input;
a second down-sampling layer configured to receive an output of the second convolution layer as input;
a first up-sampling layer configured to receive an output of the second down-sampling layer as input;
a third convolution layer configured to receive an output of the first up-sampling layer as input;
a second up-sampling layer configured to receive an output of the third convolution layer as input;
a fourth convolution layer configured to receive an output of the second up-sampling layer as input; and
an output layer configured to receive an output of the fourth convolution layer as input and output the generated high-resolution sensor image.

7. The method of claim 1, wherein:
the input data is based on absolute values of sensor data magnitudes in the multiple dimensions; and
the absolute values of the sensor data magnitudes are input into the model via a single input channel.

8. The method of claim 1, wherein the electromagnetic sensor is a radar system.

9. The method of claim 8, wherein the multiple dimensions comprise at least two of:
a range domain;
a Doppler domain;
an azimuth-angle domain; or
an elevation-angle domain.

10. The method of claim 9, wherein generating the first sensor image comprises:
determining, based on the sensor data, a set of beam vectors that encompasses all range bins and Doppler bins associated with the sensor data; and
selecting a subset of beam vectors, including a set of Doppler bins at all range bins, from the beam vectors that encompass all the range bins and Doppler bins; and
obtaining, based on the subset of beam vectors, a range-angle map.

11. The method of claim 10, wherein:
the set of beam vectors are derived from data received by sparse receive channels and dense receive channels of the radar sensor;
the input data is based on magnitudes and phases of the subset of beam vectors received by the sparse and the dense receive channels;
the magnitudes of the beam vectors received by the sparse and the dense receive channels are input on a first channel of the model;
the phases of the beam vectors received by the sparse and the dense receive channels are input on a second channel of the model; and
training the model further comprises using a deep neural network and a filter kernel configured to capture features of the input data.

12. The method of claim 10, further comprising:
using a Discrete Fourier Transform by applying a Fast Fourier Transform (FFT) to the subset of beam vectors;
using a filter size approximating the input data, and wherein:
the set of beam vectors are derived from data received by sparse receive channels and dense receive channels of the radar sensor;
the input data is based on magnitudes and phases of the subset of beam vectors received by the sparse and the dense receive channels;
the magnitudes of the beam vectors received by the sparse receive channels are input on a first channel of the model;
the phases of the beam vectors received by the sparse receive channels are input on a second channel of the model;
the magnitudes of the beam vectors received by the dense receive channels are input on a third channel of the model; and
the phases of the beam vectors received by the dense receive channels are input on a fourth channel of the model.

13. The method of claim 12, wherein the magnitudes of the subset of beam vectors are bounded.

14. The method of claim 1, wherein the model is trained using a general adversarial network.

15. The method of claim 1, wherein training the model comprises:
comparing the generated high-resolution sensor image to the second sensor image;
calculating, based on comparing the generated high-resolution sensor image to the second sensor image, an error for the generated high-resolution sensor image; and
further training the model based on the error.

16. The method of claim 1, wherein the second sensor image is generated based on an iterative adaptive algorithm.

17. A system comprising:
a radar sensor;
a trained model trained to generate a high-resolution sensor image;
at least one processor configured to:
receive, from the radar sensor, radar data;
determine, based only on the radar data, a set of beam vectors derived from the radar data that encompasses all range bins and Doppler bins associated with the sensor data;
select a subset of the beam vectors, including a set of Doppler bins at all range bins, from the beam vectors that encompass all the range bins and Doppler bins;
apply a Fast Fourier Transform (FFT) to the subset of beam vectors;

input, into the trained model, magnitudes of the subset of beam vectors into at least a first channel of the model;
input, into the trained model, phases of the subset of beam vectors into at least a second channel of the model;
receive, from the trained model, the generated high-resolution sensor image; and
output the generated high-resolution sensor image for at least one of detecting objects, tracking objects, classification, or segmentation.

18. The system of claim 17, wherein the trained model comprises:
an input layer;
at least one convolution layer;
at least one down-sampling layer;
at least one up-sampling layer; and
an output layer.

19. The system of claim 17, wherein the model comprises:
an input layer configured to receive the magnitudes of the subset of beam vectors on at least the first channel of the model and the phases of the subset of beam vectors on at least the second channel of the model;
a first convolution layer configured to receive an output of the input layer as input;
a first down-sampling layer configured to receive an output of the first convolution layer as input;
a second convolution layer configured to receive an output of the first down-sampling layer as input;
a second down-sampling layer configured to receive an output of the second convolution layer as input;
a first up-sampling layer configured to receive an output of the second down-sampling layer as input;
a third convolution layer configured to receive an output of the first up-sampling layer as input;
a second up-sampling layer configured to receive an output of the third convolution layer as input;
a fourth convolution layer configured to receive an output of the second up-sampling layer as input; and
an output layer configured to receive an output of the fourth convolution layer as input and output the generated high-resolution sensor image.

20. The system of claim 17, wherein the trained model is trained using a general adversarial network.

* * * * *

UNITED STATES PATENT AND TRADEMARK OFFICE
CERTIFICATE OF CORRECTION

PATENT NO. : 12,411,228 B2  
APPLICATION NO. : 17/661223  
DATED : September 9, 2025  
INVENTOR(S) : Kanishka Tyagi et al.

Page 1 of 1

It is certified that error appears in the above-identified patent and that said Letters Patent is hereby corrected as shown below:

On the Title Page

Item [72], Line 4: Delete "Los Angeles," and insert --Yorba Linda,-- therefor

Signed and Sealed this  
Twenty-third Day of December, 2025

John A. Squires  
*Director of the United States Patent and Trademark Office*